Aug. 2, 1927.
E. CAUDA
1,637,409
CINEMATIC APPARATUS
Filed March 22, 1923
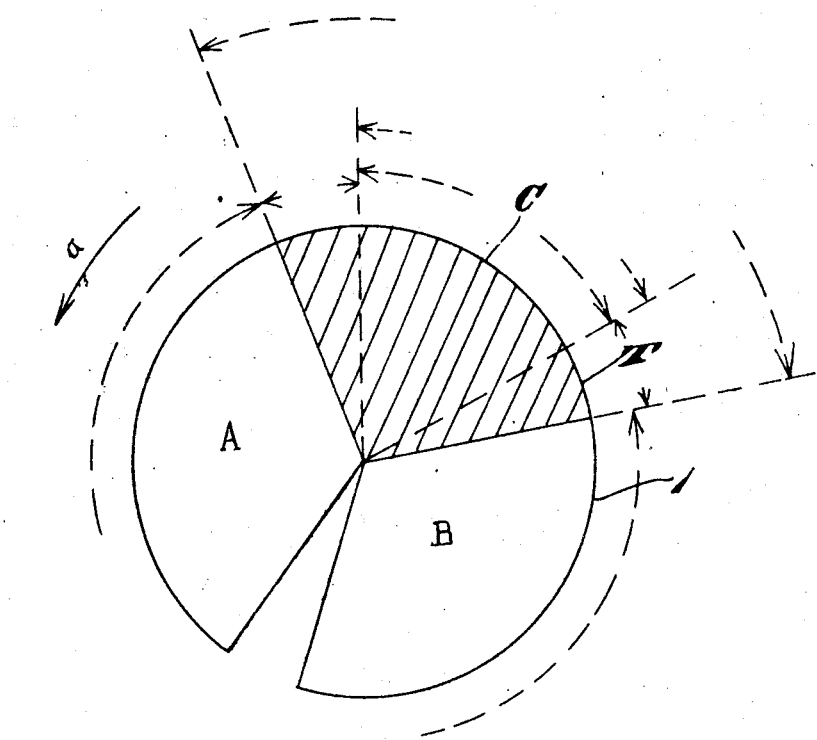
Inventor:
Ernesto Cauda.

Patented Aug. 2, 1927.

1,637,409

UNITED STATES PATENT OFFICE.

ERNESTO CAUDA, OF QUINTO AL MARA, GENOA, ITALY.

CINEMATIC APPARATUS.

Application filed March 22, 1923, Serial No. 626,808, and in Italy March 23, 1922.

This invention relates to a motion picture machine which may be used for taking pictures and for projecting them without requiring any change or alteration in the shutter disc. For this purpose the gaps in the shutter disc, which disc has several blades or wings are all closed with the exception of one. Here the closure is effected by means of a color filter which does not transmit the actinic rays.

It is very well known that the periods of feed and periods of rest in the film movement for projecting motion picture machines are entirely different from the corresponding movements of motion picture taking machines. These periods are respectively the periods at which obduration or obscuration of the camera and exposure take place. In projecting a picture the period of rest must be as long as feasible, and the period of feed, as short as feasible, so as to produce great intensity of light on the screen. In taking pictures, however, the opposite considerations must be observed, and the film in the camera must be exposed for a very short period only—as short as possible so as to produce the very sharpest pictures, even if the object should be in rapid motion. In order to provide an apparatus equally useful for taking pictures and for projecting the same, it is necessary that these conditions which are actually contradictory to each other must be complied with. It is necessary, therefore, that the period of exposure in taking pictures be in agreement with the conditions of the ordinary standard motion picture taking camera, but the period of rest of the film must correspond to those conditions which prevail in a motion picture projecting camera, and in which, therefore, very rapid movements of the film alternate with relatively long periods of rest. Those known apparatus which are used at the present for projection and for taking pictures are usually very simple motion picture taking apparatus in which the film feed periods and the film rest periods are proportioned suitably for projection, and in these motion picture machines the conditions which differ upon taking pictures from the conditions upon projecting the same are met by providing two alternately exchangeable shutter discs or by providing a single shutter disc having blades adjustable to comply with the different conditions. According to the present invention a single non-variable shutter disc is used having wings the number of which and the size of which correspond to the requirements of the projection apparatus, and in this disc the openings, excepting a single opening, are closed by a color filter which is not influenced by actinic rays and which transmits as much light as possible for observation by the eye. The shutter is mounted on its spindle in such manner that upon taking pictures the gap which is not covered by the film passes the window before any of the other gaps pass this window, and this sequence of passages of the gaps in front of the window with the non-obstructed gap as the first one is repeated after every period of feed of the film.

In selecting the shade of the color filter, it is very important to select a color which is as effective as possible for the eye, as for instance yellow or yellowish green, and this filter must at the same time be inactinic. A solution of aurantium is most effective, for the stain produced by this solution absorbs the violet rays, ultraviolet rays and the blue rays, that is, those rays which have the greatest actinic effect.

Of importance is also the following notable advantage. It is known that the frequency at which the best results for merging successive pictures into each other are obtained is greatly dependent upon the color of the pictures. It is known that yellowish green produces this frequency, or expressed in other words, the frequency may be less than that frequency which is necessary for this complete merging of successive pictures where white light is used, and hence a smaller frequency is necessary where the picture appears in tint, as for instance in yellowish green. The result, therefore, is the same as for the shutter disc of the present application, as compared with a shutter disc of an ordinary motion picture taking apparatus, as a smaller number of blades or wings, or if it has the same number of blades or wings, it has a slower speed.

In the accompanying drawing a diagrammatic view of the invention is shown. The disc is indicated at 1, the wings at A, B, C, and the openings at S. The color filter which closes all but one of the openings, is indicated at T.

I claim:

Motion picture apparatus useful for taking pictures as well as for projecting the same, characterized by a nonvariable shutter disc having a plurality of segmental blades and segmental gaps therebetween, the gaps with the exception of one, being covered by a filter which transmits some visible light but no actinic light.

In testimony whereof I affixed my signature.

ERNESTO CAUDA.